US007060764B2

(12) United States Patent
Yang et al.

(10) Patent No.: US 7,060,764 B2
(45) Date of Patent: Jun. 13, 2006

(54) METHOD FOR POLYMERIZATION AND COPOLYMERIZATION OF ETHYLENE

(75) Inventors: Chun-Byung Yang, Taejon (KR); Yong-Bok Lee, Seosan (KR); Sang-Yull Kim, Sungnam (KR); Won-Young Kim, Taejon (KR)

(73) Assignee: Samsung General Chemicals, Co., Ltd., Chungcheongnam Province (KR)

( * ) Notice: Subject to any disclaimer, the term of this patent is extended or adjusted under 35 U.S.C. 154(b) by 636 days.

(21) Appl. No.: 10/325,630

(22) Filed: Dec. 19, 2002

(65) Prior Publication Data

US 2004/0030077 A1 Feb. 12, 2004

(51) Int. Cl.
C08F 4/646 (2006.01)
C08F 10/00 (2006.01)

(52) U.S. Cl. .............................. 526/124.8; 526/124.3; 526/124.9; 526/125.7; 526/348; 526/352; 502/127; 502/128; 502/116

(58) Field of Classification Search ............. 526/124.3, 526/124.8, 124.9, 125.7, 348, 352; 502/116, 502/127, 128
See application file for complete search history.

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scata et al. |
| 4,226,963 A | 10/1980 | Giannini et al. |
| 4,263,169 A | 4/1981 | Scata et al. |
| 4,277,372 A | 7/1981 | Matlack |
| 4,315,835 A | 2/1982 | Scata et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,399,054 A | 8/1983 | Ferraris et al. |
| 4,401,589 A | 8/1983 | Kioka et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,518,706 A | 5/1985 | Gessell |
| 4,529,716 A | 7/1985 | Banzi et al. |
| 4,541,513 A | 9/1985 | Payne |
| 4,579,833 A | 4/1986 | Collomb et al. |
| 4,613,655 A | 9/1986 | Longi et al. |
| 4,614,727 A | 9/1986 | Longi et al. |
| 4,642,328 A | 2/1987 | Morterol et al. |
| 4,761,392 A | 8/1988 | Shiga et al. |
| 4,777,639 A | 10/1988 | Whitehouse |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbe et al. |
| 4,988,656 A | 1/1991 | Arzoumanidis et al. |

(Continued)

FOREIGN PATENT DOCUMENTS

DE 2553104 6/1977

(Continued)

OTHER PUBLICATIONS

Stokes et al., "Reactions of Cobaloxime Anions and/or Hydrides with Enynes as a New, General Route to 1, 3- and 1,2-Dienylcobaloxime Complexes," Organometallics, 1996, vol. 15, pp. 2624-2632.

(Continued)

Primary Examiner—Caixia Lu
(74) Attorney, Agent, or Firm—Meyertons, Hood, Kivlin, Kowert & Goetzel, P.C.; Eric B. Meyertons

(57) ABSTRACT

A method for polymerization and copolymerization of ethylene is disclosed. The polymerization is carried out in the presence of a preactivated titanium solid complex catalyst supported on a carrier containing magnesium. The resulting polymers have the advantage of high bulk density and broad molecular weight distribution.

11 Claims, No Drawings

U.S. PATENT DOCUMENTS

| | | | |
|---|---|---|---|
| 4,990,479 A | 2/1991 | Ishimaru et al. | |
| 5,013,702 A | 5/1991 | Arzoumanidis et al. | |
| 5,059,570 A | 10/1991 | Bailly et al. | |
| 5,061,667 A | 10/1991 | Murata et al. | |
| 5,081,090 A | 1/1992 | Arzoumanidis et al. | |
| 5,104,838 A | 4/1992 | Fujita et al. | |
| 5,106,807 A | 4/1992 | Morini et al. | |
| 5,124,297 A | 6/1992 | Arzoumanidis et al. | |
| 5,130,284 A | 7/1992 | Terano et al. | |
| 5,134,104 A | 7/1992 | Sasaki et al. | |
| 5,175,332 A | 12/1992 | Chatterton et al. | |
| 5,182,245 A | 1/1993 | Arzoumanidis et al. | |
| 5,244,996 A | 9/1993 | Kawasaki et al. | |
| 5,419,116 A | 5/1995 | Rast et al. | |
| 5,459,116 A | 10/1995 | Ro et al. | |
| 5,502,128 A | 3/1996 | Flores et al. | |
| 5,585,317 A | 12/1996 | Sacchetti et al. | |
| 5,587,440 A | 12/1996 | Ehlers et al. | |
| 5,643,845 A | 7/1997 | Tajima et al. | |
| 5,696,044 A | 12/1997 | Zakharov et al. | |
| 5,726,261 A | 3/1998 | Sacchetti et al. | |
| 5,780,378 A | 7/1998 | Toida et al. | |
| 5,798,424 A | 8/1998 | Kong et al. | |
| 5,817,591 A | 10/1998 | Shamshoum et al. | |
| 5,844,046 A | 12/1998 | Ohgizawa et al. | |
| 5,849,654 A | 12/1998 | Fushimi et al. | |
| 5,849,655 A | 12/1998 | Shamshoum et al. | |
| 5,869,418 A | 2/1999 | Iiskola et al. | |
| 5,880,056 A | 3/1999 | Tsutsui et al. | |
| 5,936,049 A | 8/1999 | Kojoh et al. | |
| 5,968,862 A | 10/1999 | Abbott et al. | |
| 6,034,025 A | 3/2000 | Yang et al. | |
| 6,066,702 A | 5/2000 | Ro et al. | |
| 6,114,276 A | 9/2000 | Kong et al. | |
| 6,214,759 B1 | 4/2001 | Chang et al. | |
| 6,291,385 B1 | 9/2001 | Lee et al. | |
| 6,482,764 B1 | 11/2002 | Chang et al. | |
| 6,803,338 B1 * | 10/2004 | Yang et al. | 502/103 |
| 6,831,033 B1 * | 12/2004 | Yang et al. | 502/118 |
| 2001/0031694 A1 | 10/2001 | Yang et al. | |
| 2002/0037980 A1 | 3/2002 | Yang et al. | |
| 2002/0045537 A1 | 4/2002 | Yang et al. | |
| 2002/0120079 A1 | 8/2002 | Ro et al. | |

FOREIGN PATENT DOCUMENTS

| | | |
|---|---|---|
| DE | 3636060 | 5/1988 |
| EP | 131832 | 5/1987 |
| EP | 0385765 | 9/1990 |
| EP | 0 350 170 | 3/1994 |
| EP | 0 602 922 | 6/1994 |
| EP | 0 606 125 | 5/1997 |
| GB | 1335887 | 10/1973 |
| GB | 1492618 | 11/1977 |
| GB | 1577643 | 10/1980 |
| JP | 51-136625 | 11/1976 |
| JP | 52-111528 | 9/1977 |
| JP | 63-191811 | 8/1988 |
| JP | 09-176226 | 7/1995 |
| WO | WO 00/73355 | 12/2000 |
| WO | WO 00/73356 | 12/2000 |
| WO | WO 01/32718 | 5/2001 |

OTHER PUBLICATIONS

Tinkler et al., "Polymerisation of ethene by the novel titanium complex [Ti(Me$_3$SiNCH$_2$CH$_2$NSiMe$_3$)Cl$_2$]; a metallocene analogue," Chem. Commun., 1996, pp. 2623-2624.

Edelmann, "N-silylated benzamidines: versatile building blocks in main group and coordination chemistry," Coordination Chemistry Reviews, vol. 137, 1994, pp. 403-481.

Zhou et al., "Synthesis and Structure of Novel Bridged Dinuclear Indium Complexes," Inorg. Chem., 1996, vol. 35, pp. 1423-1424.

Zhou et al., "Bulky Amidinate complexes of Tin(IV). Synthesis and Structure of Sn(RNC(R')NR)$_2$Cl$_2$ (R = Cyclohexyl, R'=H, Me; R =SiMe$_3$,R'=$^t$Bu), " Inorg. Chem., 1997, vol. 36, pp. 501-504.

Linden et al., "Polymerization of α-Olefins and Butadiene and Catalytic Cyclotrimerization of 1-Alkynes by a New Class of Group IV Catalysts. control of molecular Weight and Polymer Microstructure via Ligand Tuning in Sterically Hindered Chelating Phenoxide Titanium and Zirconium Species," J. Am. Chem. Soc., 1995, vol. 117, pp. 3008-3021.

* cited by examiner

METHOD FOR POLYMERIZATION AND COPOLYMERIZATION OF ETHYLENE

TECHNICAL FIELD

The present invention relates to a method for polymerization and copolymerization of ethylene using a pre-activated titanium solid complex catalyst supported on a carrier containing magnesium.

BACKGROUND OF THE INVENTION

Catalysts for polymerization or copolymerization of ethylene, which include magnesium, are known to have very high catalytic activity and provide polymers of high bulk density, and are suitable for liquid phase or gas phase polymerization. Liquid phase polymerization of ethylene is a polymerization process performed in a medium such as bulk ethylene, isopentane or hexane. The important features of the catalysts for the processability in this process are catalytic activity, bulk density of the resultant polymers, and the amount of low molecular weight material melted into the medium. The molecular weight distribution of the polymers depends on the characteristic of catalyst itself and the polymerization process. The polymers which are produced by using Ziegler-Natta type catalysts in a single reactor, as a slurry or in the gas phase, generally have narrow molecular weight distribution. Because of this molecular structure, processability of polymers is lowered and tensile strength and rigidity in the molten state is limited, thereby resulting in the distortion, contraction of shape and Parrison deflection during processing. Moreover, these polymers are difficult to apply to the production of large scale pipes or large blow molding products which require high mechanical resistance in a molten state. When the molecular weight of the producing polymer is increased, it has an advantage of increasing the tensile strength, however is more difficult to process. This causes problems such as cracking during processing. In order to overcome these problems, it is desirable to increase the molecular weight while having a broad molecular weight distribution since excellent processability can be obtained while maintaining high tensile strength.

Many titanium-based catalysts containing magnesium for olefin polymerization, and the manufacturing methods thereof have been reported. Specifically processes making use of magnesium solutions to obtain catalysts which can generate olefin polymers of high bulk density are known. Magnesium solutions may be obtained by reacting magnesium compounds with such electron donors as alcohols, amines, cyclic ethers, or organic carboxylic acids in the presence of a hydrocarbon solvent. The formation of magnesium solutions by the reaction of magnesium compounds with an alcohol is disclosed in U.S. Pat. Nos. 3,642,746, 4,336,360, 4,330,649 and 5,106,807. Further, methods for the production of catalysts containing magnesium by reacting a liquid-phase magnesium solution with a halogenated compound, such as titanium tetrachloride, are well known. Moreover, there have been attempts to control polymerization activity or molecular weight distribution of polymers by adding ester compounds. Such catalysts provide high bulk density to the resultant polymers, but their catalytic activities or the molecular weight distribution of the resulting polymers could be improved. Moreover, tetrahydrofuran, a cyclic ether, has been used as a solvent for a magnesium compound in U.S. Pat. Nos. 4,477,639 and 4,518,706.

Meanwhile, U.S. Pat. Nos. 4,847,227, 4,816,433, 4,829,037, 4,970,186, and 5,130,284 have reported the use of such electron donors as dialkylphthalate, phthaloyl chloride, etc. in reaction with a titanium chloride compound for the production of olefin polymerization catalysts having improved polymerization activity, and which are capable of enhancing the bulk density of resultant polymers.

U.S. Pat. No. 5,459,116 has reported a method of production of a titanium solid catalyst by contact-reacting a magnesium solution containing an ester having at least one hydroxyl group as an electron donor with a titanium compound. By this method, it is possible to obtain a catalyst having high polymerization activity, which accords high bulk density to resultant polymers, but there is room for yet more improvements.

U.S. Pat. No. 3,899,477 has disclosed a catalyst which is prepared from titanium halide, vanadium halide and organoaluminum compounds. This catalyst can be used to produce polymers having broad molecular weight distributions by treating the catalyst with alkylaluminum sesquiethoxide and trialkylaluminum before polymerization. This prior art, however, has disadvantages in that the catalyst production process is complicated and it is difficult to control the polymerization process conditions due to the differences between titanium and vanadium reactivity to hydrogen, monomers and co-monomers.

As described above, it is very difficult to produce polymers with broad molecular weight distribution by using common Ziegler-Natta type catalysts while maintaining high catalytic activity and high bulk density of resultant polymers. Moreover, conventional preparation techniques for catalysts tend to be complicated and such catalysts tend to make control of polymerization processes difficult. Consequently, a method for controlling the molecular weight distribution of polymer is needed in order to expand the use of ethylene polymer and to improve their processability and physical properties.

SUMMARY OF THE INVENTION

Disclosed herein are methods for producing polymers and copolymers of ethylene by means of catalyst having improved catalytic activity, wherein the produced polymers have high bulk density and broad molecular weight distribution.

DETAILED DESCRIPTION OF THE PREFERRED EMBODIMENTS

In one embodiment, the polymerization and copolymerization of ethylene is carried out in the presence of a preactivated solid titanium catalyst and an organometallic compound formed from a metal of Group II or III of the Periodic Table. The preactivated solid titanium catalyst may be prepared by a procedure that includes: (i) preparing a magnesium solution by contact-reacting a halogenated magnesium compound with an alcohol; (ii) reacting the magnesium solution prepared by step (i) with an ester compound having at least one hydroxyl group and a silicon compound having at least one alkoxy group; (iii) producing a solid titanium catalyst by reacting the magnesium solution prepared by step (ii) with a mixture of a titanium compound and haloalkane compound; and (iv) preactivating the solid titanium catalyst with diethylaluminum chloride, ethylaluminumdichloride, ethylaluminumsesquichloride, isoprenylaluminum, or mixtures thereof.

In the production of the preactivated solid titanium catalyst used for polymerization and copolymerization of ethylene, the solid titanium catalyst obtained by step (iii) can be reacted with a titanium compound once or more before being preactived by step (iv).

The types of halogenated magnesium compounds that may be used include, but are not limited to: di-halogenated magnesiums such as magnesium chloride, magnesium iodide, magnesium fluoride, and magnesium bromide; alkymagnesium halides such as methylmagnesium halide, ethylmagnesium halide, propylmagnesium halide, butylmagnesium halide, isobutylmagnesium halide, hexylmagnesium halide, and amylmagnesium halide; alkoxymagnesium halides such as methoxymagnesium halide, ethoxymagensium halide, isopropoxymagnesium halide, butoxymagnesium halide and octoxymagnesium halide; and aryloxymagnesium halides such as phenoxymagnesium halide and methyl-phenoxymagnesium halide. The magnesium compounds can be used as a single compound or as a mixture of two or more of magnesium compounds. Further, the above magnesium compounds can be effectively used in the form of a complex compound with other metals.

Some of the compounds listed above can be represented by a simple formula, but others may not be so represented depending on the production methods of magnesium compounds. In the latter cases, it may be generally regarded as a mixture of some of the listed compounds. For example, the following compounds magnesium compounds may be used: compounds obtained by reacting magnesium compounds with polysiloxane compounds, silane compounds containing halogen, ester, or alcohol; and compounds obtained by reacting magnesium metals with alcohol, phenol, or ether in the presence of halosilane, phosphorus pentachloride, or thionyl chloride. The preferable magnesium compounds are magnesium halides, especially magnesium chloride or alkylmagnesium chloride having an alkyl group of preferably 1~10 carbons, alkoxymagnesium chlorides having an alkoxy group of preferably 1~10 carbons, and aryloxymagnesium chlorides having aryloxy group of preferably 6~20 carbons.

The magnesium solution may be prepared as a solution by using the aforementioned magnesium compounds and an alcohol in the presence or absence of a hydrocarbon solvent. Hydrocarbon solvents, include aliphatic hydrocarbons such as pentane, hexane, heptane, octane, decane, and kerosene; alicyclic hydrocarbons such as cyclopentane, methylcyclopentane, cyclohexane, and methylcyclohexane; aromatic hydrocarbons such as benzene, toluene, xylene, ethylbenzene, cumene, and cymene; and halogenated hydrocarbons such as dichloropropane, dichloroethylene, trichloroethylene, carbon tetrachloride, and chlorobenzene.

When the halogenated magnesium compound is converted into a magnesium solution, alcohol is used preferably in the presence of the aforementioned hydrocarbons. The types of alcohol include those containing 1~20 carbon atoms, such as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl-alcohol, although alcohols containing 1~12 carbon atoms are preferable. The average size of a target catalyst and its particle distribution may vary according to the types and amount of alcohol, the types of magnesium compounds, and the ratio of magnesium compound to alcohol. The total amount of alcohol required to obtain the magnesium solution is at least 0.5 mol per one mole of magnesium compounds, preferably 1.0~20 mol, and more preferably 2.0~10 mol per one mole of magnesium compounds.

During the production of the magnesium solution, the reaction of a halogenated magnesium compound with an alcohol is carried out in the presence of a hydrocarbon medium. The reaction temperature, while variable depending on the types and the amount of alcohol, is at least about $-25°$ C., preferably $-10~200°$ C., and more preferably about $0~150°$ C. It is preferable to carry out the reaction for about 15 minutes ~5 hours, preferably for about 30 minutes ~4 hours.

Of the electron donors used in the preparation of the catalyst, ester compounds having at least one hydroxyl group including, but not limited to: unsaturated aliphatic acid esters having at least one hydroxyl group such as 2-hydroxy ethylacrylate, 2-hydroxy ethylmethacrylate, 2-hydroxy propylacrylate, 2-hydroxy propylmethacrylate, 4-hydroxy butylacrylate, and pentaerythritol tri-acrylate; aliphatic monoesters or polyesters having at least one hydroxyl group such as 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxycaproate, and diethyl bis-(hydroxymethyl) malonate; aromatic esters having at least one hydroxyl group such as 2-hydroxy ethyl benzoate, 2-hydroxy ethyl salicylate, methyl-4-(hydroxy methyl) benzoate, methyl-4-hydroxy benzoate, ethyl-3-hydroxy benzoate, 4-methyl salicylate, ethyl salicylate, phenyl salicylate, propyl-4-hydroxy benzoate, phenyl 3-hydroxy naphthanoate, monoethylene glycol monobenzoate, diethylene glycol monobenzoate, and triethylene glycol monobenzoate; or alicyclic esters having at least one hydroxyl group such as hydroxy butyl lactone. The amount of the ester compound having at least one hydroxyl group is 0.001~5 one mol per one mole of magnesium, or preferably 0.01~2 mol per one mole of magnesium.

A silicon compound having at least one alkoxy group, which can be used as another electron donor in producing catalystsis represented by a general formula of $R_nSi(OR)_{4-n}$ (where, 'R' is a hydrocarbon having 1~12 carbons, and 'n' is an integer between 1 and 3) is preferable. In particular, the following compounds can be used: dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, methyltriaryloxysilane. The amount of the alkoxy silicon compound is preferably 0.05~3 mol per one mole of magnesium, more preferably 0.1~2 mol per one mole of magnesium.

As for the temperature for the contact-reaction of the liquid magnesium compound solution with an ester compound having at least one hydroxyl group and an alkoxy silicone compound, the temperature of 0~100° C. is appropriate, more preferably 10~70° C.

The magnesium compound solution obtained as above is reacted with a mixture of a liquid titanium compound represented by the general formula of $Ti(OR)_aX_{4-a}$ (where 'R' is a hydrocarbon group, 'X' a halogen atom, 'a' an integer between 0 and 4), and a haloalkane compound to crystalize the resulting catalyst particles. The hydrocarbon group represented by R in the general formula of the liquid titanium compound is preferably an alkyl group having 1~10 carbons. The titanium compounds satisfying the general formula of $Ti(OR)_aX_{4-a}$ include, but are not limited to 4-halogenated titanium such as $TiCl_4$, $TiBr_4$, and $TiI_4$; 3-halogenated alkoxy titanium such as $Ti(OCH_3)Cl_3$, $Ti(OC_2H_5)Cl_3$, $Ti(OC_2H_5)Br_3$, and $Ti(O(i-C_4H_9))Br_3$; 2-halogenated alkoxy titanium compounds such as $Ti(OCH_3)_2Cl_2$, $Ti(OC_2H_5)_2Cl_2$, $Ti(O(i-C_4H_9))_2Cl_2$, and $Ti(OC_2H_5)_2Br_2$; and tetraalkoxy titanium such as $Ti(OCH_3)_4$, $Ti(OC_2H_5)_4$, and $Ti(OC_4H_9)_4$. A mixture of the above titanium compounds can also be used in the present invention. However, the preferable titanium compounds are those containing halogen, or more preferably titanium tetrachloride.

The haloalkane compound is a compound containing at least one halogen and with carbon atoms of 1~20, or mixture thereof. Examples of the haloalkane compounds include, but not limited to: monochloromethane, dichloromethane, trichloromethane, tetrachloromethane, monochloroethane, 1,2-dichloroethane, monochloropropane, monochlorobutane, monochloro-secondarybutane, monochloro-tertiarybutane, monochlorocyclohexane, chlorobenzene, monobromomethane, monobromopropane, monobromobutane or monoiodomethane. The preferable haloalkane compound is a chloroalkane compound.

The appropriate amount of the mixture of a titanium compound and haloalkane compound used in the recrystallization of the magnesium compound solution is 0.1~200 mol per one mole of magnesium compounds, preferably 0.1~100 mol, more preferably 0.2~80 mol per one mole of magnesium compounds. The mole ratio of the titanium compound to the haloalkane compound in the mixture is appropriately 0.05~ 0.95, more preferably 0.1~0.8. When the magnesium compound solution is reacted with the mixture of a titanium compound and a haloalkane compound, the morphology and the sizes of the resultant recrystallized solid constituents vary a great deal depending on the reaction conditions. Hence, the reaction of the magnesium compound solution with the mixture of a titanium compound and a halokane compound should be carried out at a sufficiently low temperature to result in formation of solid constituents. Preferably, the contact-reaction should be carried out at the temperature of −70~70° C., more preferably at the temperature of −50~50° C. After the contact-reaction, the reacting temperature is slowly raised for sufficient reaction for the duration of 0.5~5 hours at 50~150° C.

The particles of the solid catalysts obtained by the above process can further be reacted with the titanium compounds. The titanium compounds used in this step are titanium halides or halogenated alkoxy titaniums with alkoxy functional group having 1~20 carbons. Mixtures of these compounds can also be used as needed. Of these compounds, however, the appropriate compounds are titanium halides or halogenated alkoxy titanium compounds having an alkoxy functional group having 1~8 carbons, and more preferably titanium tetrahalide.

The solid titanium catalyst component obtained by the above process is preactivated by contact-reacting the solid titanium catalyst with diethyl aluminum chloride, ethyl aluminum dichloride, ethyl aluminum sesquichloride, isoprenyl aluminium, or mixture thereof.

The amount of these organic aluminum compounds is preferably 0.05 mol~50.0 mol per one mol of titanium in the catalyst, and more preferably 0.1 mol~10.0 mol per one mol of titanium. The reaction is carried out preferably at a temperature of −50~50° C., more preferably at −20~30° C. After the contact-reaction, the reacting temperature is slowly raised and the reaction is continued for the duration of 0.5~7 hours at 0~150° C.

The solid titanium catalyst may be prepolymerized with ethylene or an α-olefin before being used in the polymerization reaction. The prepolymerization may be carried out in the presence of a hydrocarbon solvent, such as hexane, at a sufficiently low temperature, under pressure with ethylene or an α-olefin, and in the presence of the above catalyst and an organic aluminium compound (e.g., triethylaluminium). The prepolymerization, by maintaining the morphology of the catalyst by surrounding the catalyst particles with polymers, is helpful in the production of polymers having a preferred morphology in the polymerization process. The weight ratio of polymers to catalysts after prepolymerization is about 0.1:1~20:1.

The method for polymerization and copolymerization of ethylene according to the present invention is carried out by using a catalyst system including (a) the above solid titanium catalyst which is preactivated; and (b) organometallic compounds in Groups II or III of the Periodic Table. In particular, the catalyst (a) is advantageously used for the polymerization of ethylene, and also for the copolymerization of ethylene and an α-olefin having three or more carbons such as propylene, 1-butene, 1-pentene, 4-methyl-1-pentene, or 1-hexene.

The organometallic compound (b) is represented by the general formula of $MR_n$, where 'M' stands for a metal of Group II or IIIA in the Periodic Table, including, but not limited to magnesium, calcium, zinc, boron, aluminum and gallium, 'R' for an alkyl group with 1~20 carbons, such as a methyl, ethyl, butyl, hexyl, octyl or decyl group, and 'n' for the atomic valence of the metal constituent. As for more preferable organometallic compounds, a trialkyl aluminum having an alkyl group of 1~6 carbons, such as triethylaluminum and triisobutylaluminum, or the mixture thereof may be utilized. If needed, organic aluminum compounds having one or more halogen or hydride groups, such as ethylaluminum dichloride, diethylaluminum chloride, ethylaluminum sesquichloride, and diisobutylaluminum hydride may also be used.

The polymerization reaction may be carried out by gas phase polymerization, bulk polymerization in the absence of an organic solvent, or liquid phase slurry polymerization in the presence of an organic solvent. The polymerization may be carried out in the absence of oxygen, water, or other compounds that may act as a poison against the catalyst. In the case of liquid phase slurry polymerization, the preferable concentration of the solid titanium catalyst (a) with respect to the polymerization reaction system is about 0.001~5 mmol in terms of titanium atoms in catalyst per one liter of the solvent, and more preferably about 0.001~0.5 mmol. As for the solvent, the following compounds or the mixtures thereof can be used: alkanes such as pentane, hexane, heptane, n-octane, isooctane, cyclohexane and methylcyclohexane; alkylaromatics such as toluene, xylene, ethylbenzene, isopropylbenzene, ethyltoluene, n-propylbenzene and diethylbenzene; halogenated aromatics such as chlorobenzene, chloronaphthalene and ortho-dichlorobenzene. In the case of gas phase polymerization, the amount of the solid titanium catalyst (a) is about 0.001~5 mmol in terms of titanium atoms in catalyst per one liter of the polymerization reactor, preferably about 0.001~1.0 mmol, and more preferably about 0.01~0.5 mmol. The preferable concentration of the organometallic compound (b), as calculated by organometallic atom, is about 1~2,000 mol per one mole of titanium atoms in catalyst (a), and more preferably about 5~500 mol.

To increase the rate of polymerization, the polymerization is carried out at a sufficiently high temperature, regardless of the types of polymerization process. Generally, the temperature of the polymerization reaction is approximately 20~200° C., more preferably approximately 20~95° C. The appropriate pressure of monomers at the time of polymerization is 1~100 atm, more preferably 2~50 atm.

The molecular weights of the resulting polymers are determined by the melt index (ASTM D 1238), which is generally known in the art. The value of the melt index generally becomes larger as the molecular weight of the polymer decreases. In addition, the molecular weight distribution of polymers is measured by gel permeation chromatography (GPC) using the generally known method in the art.

The products obtained by using the polymerization method of the present invention are solid ethylene polymers or copolymers of ethylene and α-olefin. By using the method, polymers having high bulk density and fluidity may be obtained with sufficiently high yields, and there is no need for the removal of catalyst residues.

The present invention will be described in more detail with reference to the examples and comparative examples. The examples are for the purpose of illustration only and are not intended to limit the invention to a specific example.

EXAMPLES AND COMPARATIVE EXAMPLES

Example 1

Production of Catalyst

A solid titanium catalyst was produced by the following three steps:

(i) Preparation of magnesium solution

Into a reactor of 1.0 l, which is equipped with a mechanical stirrer, and replaced with nitrogen atmosphere, 19.0 g of $MgCl_2$ and 400 ml of decane were placed and stirred at 700 rpm. Then, 120 ml of 2-ethyl hexanol was added thereto, and the temperature was raised to 120° C., and then the reaction was allowed to continue for three hours. The homogenous solution obtained by the reaction was cooled to room temperature (25° C.).

(ii) Contact-Reaction of Magnesium Solution with Ester Containing Hydroxyl Group and Alkoxy Silane Compound To the magnesium solution, cooled to room temperature, 1.2 ml of 2-hydroxyethyl methacrylate and 12.0 ml of ethylsilicate were added, and then the reaction was allowed to continue for an hour.

(iii) Treatment of the Mixture of Titanium Compound and Haloalkane Compound, and Reaction of the Titanium Compound After setting the temperature of the solution obtained by step (ii) to 15° C., a solution of a mixture of 40 ml of titanium tetrachloride and 40 ml of methane tetrachloride was dripped thereto for one hour. After completing the dripping process, the temperature of the reactor was raised to 70° C. and maintained at that temperature for one hour. After stirring is finished, the supernatant of the solution was removed, and the remaining solid layer was continuously instilled with 150 ml of decane and 150 ml of titanium tetrachloride. Then, the temperature was raised to 90° C. and maintained thereat for two hours. After the reaction, the reactor was cooled to room temperature, and washed by injecting 400 ml of hexane until remaining unreacted $TiCl_4$ was removed. The titanium content in the solid catalyst so produced was 4.6%.

Preactivation

Produced solid titanium catalyst was subdivided into 200 ml of hexane slurries so that the titanium content becomes 6 mmol/l in terms of the titanium atom. The temperature of hexane slurry solution of the solid titanium catalyst was lowered to 0° C., and was slowly injected with 3.0 ml of 1M diethylaluminium chloride while stirring. When the injection was finished, the temperature of the solution was raised to 20° C. and stirred at that temperature for 5 hours to preactivate the catalyst. After 5 hours of stirring, the solution was maintained at −10° C.

Polymerization

A high-pressure reactor with 2l capacity was dried in an oven and assembled while hot. In order to make the inside of the reactor a nitrogen atmosphere, nitrogen and vacuum were alternatively purged three times in the reactor. 1,000 ml of n-hexane was injected into the reactor, and 1 mmol of triisobutylaluminum and 0.03 mmol of solid catalyst in terms of titanium atoms were added thereto. Then, 1,000 ml of hydrogen was injected. The temperature of the reactor was raised to 80° C. while stirring at 700 rpm with a stirrer, and the pressure of ethylene was set to 80 psi, and then polymerization was allowed to continue for an hour. After the polymerization, the temperature of the reactor was lowered to room temperature, and an excessive amount of ethanol solution was added to the resulting polymers. The polymer thus produced was collected by separation and was dried in a vacuum oven at 50° C. for at least six hours, to obtain polyethylene in the form of a white powder.

The polymerization activity (kg polyethylene/gram catalyst) was calculated as the weight ratio of the polymers (kg) as produced to the amount of catalysts so used (gram of catalyst). The results of polymerization are shown in Table 1, together with the bulk density (g/ml), the melt index (g/10 minutes), and the molecular weight distribution (Mw/Mn) of the polymers.

Example 2

The preactivation was carried out as in the example 1 except that 3.0 ml of 1M ethyl aluminum dichloride was used instead of 3.0 ml of 1M diethylaluminum chloride in the preactivation process. Other conditions are the same as those of example 1 and the results are shown in Table 1.

Example 3

The preactivation was carried out as in the example 1 except that 3.0 ml of 1M ethyl aluminum sesquichloride was used instead of 3.0 ml of 1M diethylaluminum chloride in the preactivation process. Other conditions are the same as those of example 1 and the results are shown in Table 1.

Example 4

The preactivation was carried out as in the example 1 except that 3.0 ml of 1M isoprenyl aluminum was used instead of 3.0 ml of 1M diethylaluminum chloride in the preactivation process. Other conditions are the same as those of example 1 and the results are shown in Table 1.

Example 5

The preactivation was carried out as in the example 1 except that 6.0 ml of 1M ethyl aluminum sesquichloride was used instead of 3.0 ml of 1M diethylaluminum chloride in the preactivation process. Other conditions are the same as those of example 1 and the results are shown in Table 1.

Example 6

The preactivation was carried out as in the example 1 except that 7.5 ml of 1M ethyl aluminum sesquichloride was used instead of 3.0 ml of 1M diethylaluminum chloride in the preactivation process. Other conditions are the same as those of example 1 and the results are shown in Table 1.

Example 7

The preactivation was carried out as in the example 1 except that 1.5 ml of 1M ethyl aluminum dichloride and 1.5 ml of 1M ethyl aluminum sesquichloride were used instead of 3.0 ml of 1M diethylaluminum chloride in the preactivation process. Other conditions are the same as those of example 1 and the results are shown in Table 1.

Example 8

The preactivation was carried out as in the example 1 except that 1.5 ml of 1M isoprenyl aluminum and 1.5 ml of 1M ethyl aluminum sesquichloride were used instead of 3.0 ml of 1M diethylaluminum chloride in the preactivation process. Other conditions are the same as those of example 1 and the results are shown in Table 1.

Comparative Example 1

The polymerization was carried out as in the example 1 except that the catalyst which was not preactivated was used. Other conditions are the same as those of example 1 and the results are shown in Table 1.

Comparative Example 2

The polymerization was carried out as in the example 1 except the catalyst which was not preactivated was used, and 1 mmol of triethyl aluminum was used instead of 1 mmol of triisobutyl aluminum in the polymerization. Other conditions are the same as those of example 1 and the results are shown in Table 1.

TABLE 1

| Example | Activity (kg PE/g of catalyst) | Bulk density (g/ml) | Melt index (g/10 min) | Molecular weight distribution (Mw/Mn) |
|---|---|---|---|---|
| 1 | 5.6 | 0.39 | 2.7 | 8.3 |
| 2 | 5.4 | 0.39 | 2.6 | 8.4 |
| 3 | 6.1 | 0.37 | 2.9 | 7.6 |
| 4 | 6.2 | 0.38 | 2.4 | 8.9 |
| 5 | 6.1 | 0.38 | 2.6 | 7.9 |
| 6 | 5.8 | 0.37 | 2.7 | 8.1 |
| 7 | 6.3 | 0.38 | 2.2 | 8.4 |
| 8 | 6.3 | 0.39 | 2.6 | 8.6 |
| CE 1 | 5.8 | 0.23 | 2.4 | 7.2 |
| CE 2 | 4.3 | 0.37 | 2.2 | 6.7 |

INDUSTRIAL APPLICABILITY

By using the method of the present invention in the polymerization and copolymerization of ethylene, it is possible to obtain polymers and copolymers of ethylene, which have high bulk density and broad molecular weight distribution. In addition, the catalyst has high catalytic activity and the polymerization process is simple.

What is claimed is:

1. A method for polymerization and copolymerization of ethylene, which is carried out in the presence of a preactivated solid titanium catalyst and an organometallic compound of metal in Group II or III of the Periodic Table, wherein
   the preactivated solid titanium catalyst is prepared by the procedure comprising:
   (i) preparing a magnesium solution by contact-reacting a halogenated magnesium compound with an alcohol;
   (ii) reacting the magnesium solution with an ester compound having at least one hydroxyl group and a silicon compound having at least one alkoxy group;
   (iii) producing solid titanium catalyst by reacting the magnesium solution of (ii) with a mixture of a titanium compound and a haloalkane compound; and
   (iv) preactivating the solid titanium catalyst with diethylaluminum chloride, ethylaluminumdichloride, ethylaluminumsesquichloride, isoprenylaluminum, or mixtures thereof.

2. The method for polymerization and copolymerization of ethylene according to claim 1, wherein the solid titanium catalyst is reacted with an additional titanium compound before being preactivated.

3. The method for polymerization and copolymerization of ethylene according to claim 1, wherein the ester compound having at least one hydroxyl group is an unsaturated aliphatic acid ester having at least one hydroxyl group, an aliphatic monoester or polyester having at least one hydroxyl group, an aromatic ester having at least one hydroxyl group, or an alicyclic ester having at least one hydroxyl group.

4. The method for polymerization and copolymerization of ethylene according to claim 1, wherein the silicon compound having at least one alkoxy group is represented by the general formula of $R_nSi(OR)_{4-n}$, where 'R' is a hydrocarbon having 1~12 carbons, and 'n' is an integer between 1 and 3.

5. The method for polymerization and copolymerization of ethylene according to claim 4, wherein the silicon compound having at least one alkoxy group is selected from the group consisting of dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltriethoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, and methyltriaryloxysilane.

6. The method for polymerization and copolymerization of ethylene according to claim 1, wherein the titanium compound is represented by the general formula of $Ti(OR)_aX_{4-a}$, where 'R' stands for a hydrocarbon group, 'X' for a halogen atom, and 'a' for an integer between 0 and 4.

7. The method for polymerization and copolymerization of ethylene according to claim 6, wherein the titanium compound is $TiCl_4$, $TiBr_4$, $TiI_4$, $Ti(OCH_3)Cl_3$, $Ti(OC_2H_5)Cl_3$, $Ti(OC_2H_5)Br_3$, $Ti(O(i-C_4H_9))Br_3$, $Ti(OCH_3)_2Cl_2$, $Ti(OC_2H_5)_2Cl_2$, $Ti(O(i-C_4H_9))_2Cl_2$, $Ti(OC_2H_5)_2Br_2$, $Ti(OCH_3)_4$, $Ti(OC_2H_5)_4$, or $Ti(OC_4H_9)_4$.

8. The method for polymerization and copolymerization of ethylene according to claim 1, wherein the haloalkane compound is a compound having at least one halogen and 1~20 carbon atoms, or a mixtures thereof.

9. The method for polymerization and copolymerization of ethylene according to claim 8, wherein the haloalkane compound is monochloromethane, dichloromethane, trichloromethane, tetrachloromethane, monochloroethane, 1,2-dichloroethane, monochloropropane, monochlorobutane, monochloro-secondarybutane, monochloro-tertiarybutane, monochlorocyclohexane, chlorobenzene, monobromomethane, monobromopropane, monobromobutane or monoiodomethane.

10. The method for polymerization and copolymerization of ethylene according to claim 1, wherein the organometallic compound of metal in Group II or III of the Periodic Table is represented by the general formula of $MR_n$, where 'M' stands for a metal in Group II or IIIA of the Periodic Table, 'R' for an alkyl group with 1~20 carbons and 'n' for the atomic valence of the metal.

11. The method for polymerization and copolymerization of ethylene according to claim 10, wherein the metal is magnesium, calcium, zinc, boron, aluminum, or gallium, and wherein the alkyl group is as a methyl, ethyl, butyl, hexyl, octyl, or decyl group.

* * * * *